April 3, 1934.  W. A. DARRAH  1,953,647
PROCESS OF TREATING METAL
Filed Nov. 11, 1931   4 Sheets-Sheet 2

William A Darrah.
Inventor.

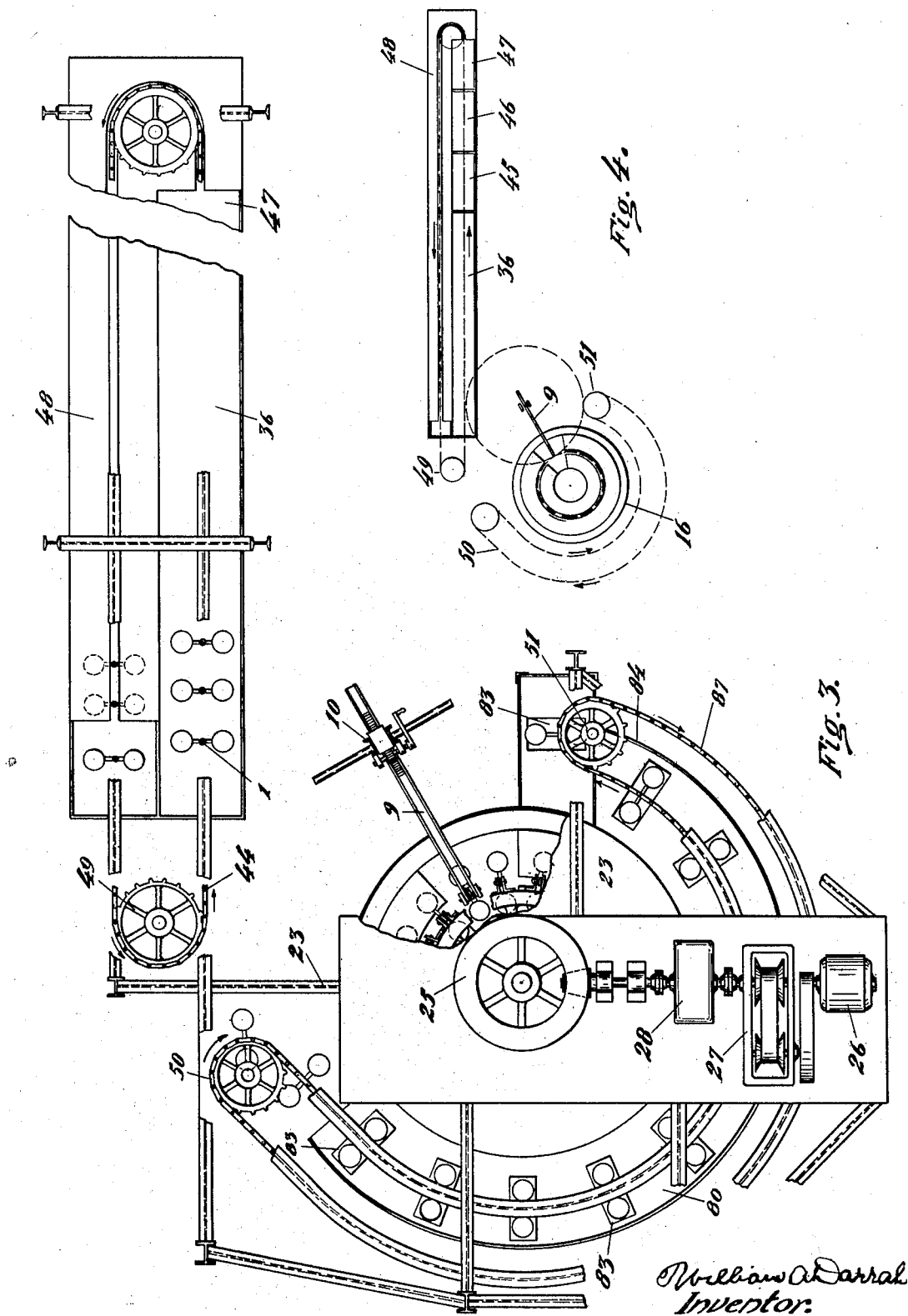

April 3, 1934.  W. A. DARRAH  1,953,647
PROCESS OF TREATING METAL
Filed Nov. 11, 1931  4 Sheets-Sheet 4

William A. Darrah
Inventor.

Patented Apr. 3, 1934

1,953,647

UNITED STATES PATENT OFFICE 1,953,647

PROCESS OF TREATING METAL

William A. Darrah, Chicago, Ill.

Application November 11, 1931, Serial No. 574,266

7 Claims. (Cl. 148—15)

This invention relates to methods, process and equipment for treating metals. Many applications of this invention lie in the field known as heat treating of metals. This portion of this invention discloses methods and equipment for controlling, developing, changing, etc., the characteristics of the metal or other material being treated. In some cases the treatment may result in a tougher or ductile material. In other cases the material may become hard and strong. In other instances the surface of the material may be given one set of characteristics as for example great hardness, while the interior portion of the metal may be given great toughness and strength. The equipment and process may change either or both the chemical and/or the physical characteristics of the material being treated.

Obviously this process and equipment may be applied to a wide range of materials. In the description which follows steel will be selected as a typical material being treated as this will aid in simplifying and abbreviating the disclosure. It should be understood, however, that my invention is not confined specifically to steel.

Some of the objects of my invention are to economically, cheaply and efficiently provide a process and equipment for developing desired characteristics in the material being treated.

In the case of steel, one object of my invention is to produce a material having a hard outer coating or shell. Another object of my invention is to produce a steel or iron alloy having a hard outer shell and a tough inner shell. Various combinations of properties can be obtained by the proper heat cycle dependent upon the nature of the materials used.

Other objects of my invention will be apparent from the drawings, descriptions and claims attached hereto.

Referring to the drawings

Figure 3 shows a plan view partly in section of one form of my invention, while

Figure 4 shows diagrammatically the steps of one complete cycle of one form of my invention.

Figure 1:
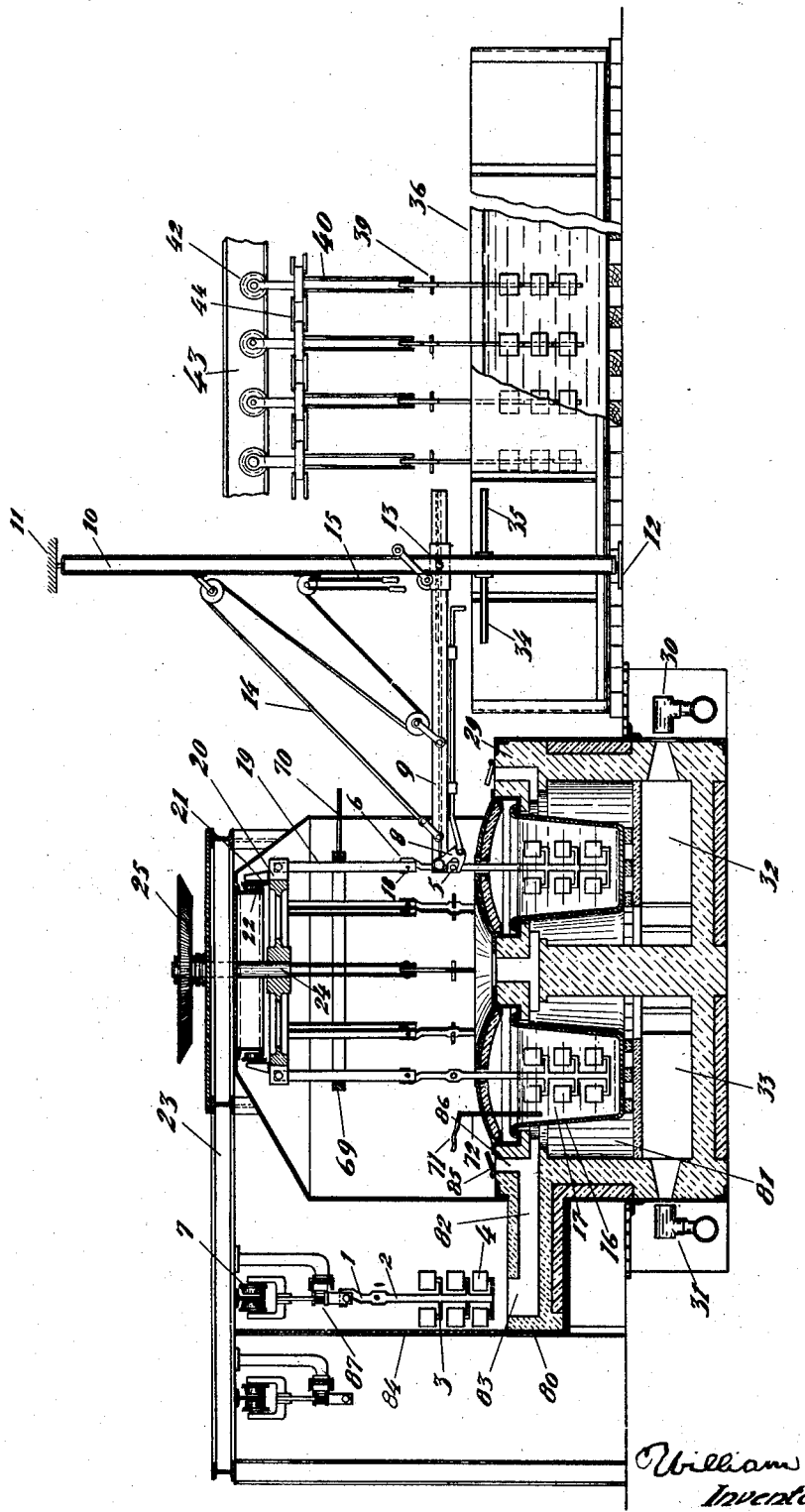
Figure 1 shows an elevation partly in section of certain portions of my invention including details of the furnace, transfer device and quench tank.

In the drawings 1 represents a support or hanger which may be considered as the unit which is handled by the equipment used in my process. Hanger 1 consists of a shank 2 carrying arms 3 which support the articles 4 being treated. For purposes of illustration these may be considered as gears, bearings, clutches or various other mechanical parts. Support 1 is provided with pins or equivalent engaging means 5 located near its central portion and with a hook 6 near its upper end.

In beginning my process the support or hanger 1 which may be assumed to be delivered by trolley 7 is engaged by the fork 8 pivotally mounted on boom 9 which in turn is carried by upright member 10. Upright member 10 is pivoted at its ends 11 and 12 to permit it to revolve as desired about its central axis. Boom 9 is pivoted about pin 13. Boom 9 is arranged to be raised by applying tension to cable 14 by means of handle 15. 16 represents a pot or container which may be formed of steel or heat resisting alloy and is filled to the desired level with a fused bath 17 which may consist of cyanide of sodium, mixtures of cyanides with sodium carbonate and sodium hydroxide or a fused mixture containing various amino or other nitrogen groups. The well known cyanamides such as calcium cyanamide may be fused and suspended through the solution with good results.

In certain other cases I may prefer to use fused baths of nitrates such as sodium or potassium nitrates or mixtures of various nitrates with sodium carbonates, sodium chloride, etc. in order to obtain the desired melting point and stability. A further description of the fused bath and its properties will be given in a later portion of this specification.

As a typical cycle I may engage hanger 1, loaded with gears or other articles 4 to be treated and swing the hanger with its load by means of boom 9 into position in heating pot 16 at the same time engaging the hook 6 on the upper end of hanger 1 with the pin 18 of support 19. It will be noted that the container or pot 16 is in the form of a hollow torus ring and above the pot is located a revolvable frame or ring 20 which carries a multiple of supports such as 19. Ring 20 carries a series of rollers 21 which run on a frame or track 22 carried by structural frame work 23. A shaft 24 rigidly fastened to revolvable frame 20 carries near its upper portion a bevel gear 25 which is driven by means of a motor 26, variable speed device 27 and gear reduction 28. It will be apparent, therefore, that hanger 1 after being placed in container 16 is carried gradually and uniformly through the container making a complete circle. It will also be obvious that additional hangers are continually added to the bath, so that the entire pot is at all times substantially filled with material being treated.

The speed of revolution of movable ring 20 controls the time that the material is immersed in the fused bath in container 16. This time will vary from a few minutes to an hour or more, depending on the nature of the material being treated, the results desired, the nature and temperature of the bath and other obvious factors which will be explained later in this specification. Pot 16 is shown mounted in setting 29 which is provided with fuel supply devices 30 and 31. Fuel supply devices should be arranged in such a manner as to completely and uniformly heat the pot 16. To accomplish this purpose, combustion spaces such as 32 and 33 are provided beneath the pot and provisions whereby the products of combustion may travel along the sides of the pot and leave by a series of flues in the upper portion. The pot, combustion chambers, flues, etc. are enclosed in a refractory housing and surrounded by a steel shell for purposes of strength and convenience.

Figure 2:
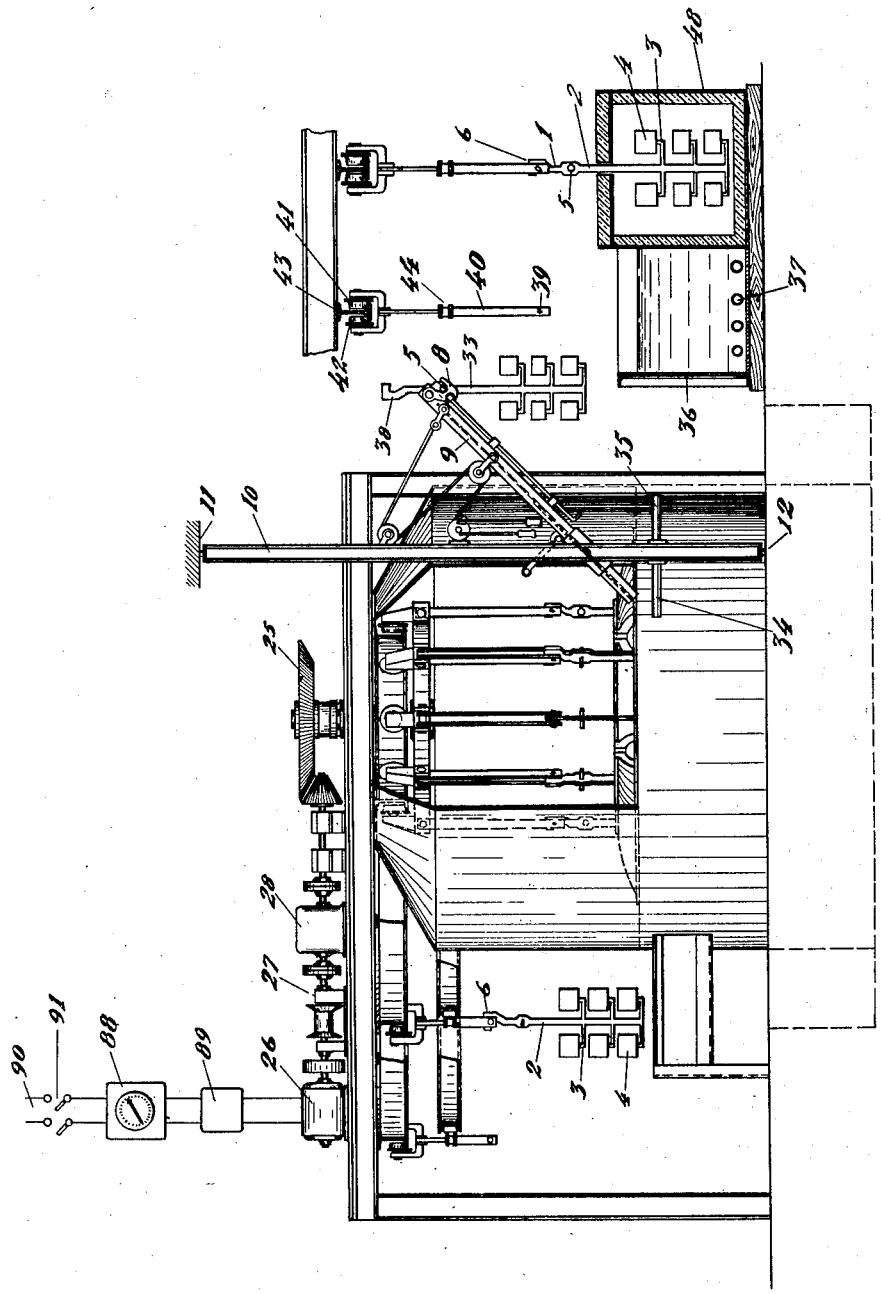
Figure 2 shows an end elevation also partly in section of the drawing furnace, rotary heating furnace and other details.

After the hanger 1 with its contents of material being treated has completed its cycle through the pot 16, it is removed by engaging fork 8 of boom 9 with pin 5 lifting the boom in substantially the position indicated for hanger 33 in Figure 2. The upright member 10 carrying boom 9 is then rapidly revolved by means of handles 34 and 35 until the hanger is in position above quench tank 36. Quench tank 36 may be filled with oil, water or other desired liquid to the proper level and provided with cooling coils 37 for maintaining its temperature at the desired figure. When placing the hanger as for example 33 in quench tank 36, hook member 38 is caused to engage with pin 39 which is carried by hanger 40 and rollers 41 and 42. These rollers engage with a track member 43 and are linked together into a continuous chain by links 44.

The chain 44 is driven at a continuous predetermined speed by any well known mechanism so that the hangers with their load of material being treated passes continuously and uniformly through quench tank 36 thereby reaching the desired temperature throughout its entire mass.

The quenching time allowed may vary from 10 or 15 minutes to as much as one or two hours, depending on size and nature of the material being quenched, the temperature and condition of the material forming the quench bath and other various factors.

After leaving the quench bath the material may be transferred automatically as for example by the equipment illustrated diagrammatically on Figure 4. This transfer equipment serves to place the hangers and the load in a cleaning bath 45, a rinsing bath 46 and a further cleaning bath 47 (see Fig. 4). The material is then transferred by a mechanism, the equivalent of that shown diagrammatically in Figure 4, into a draw oven 48 where a supply of warm air at a uniform controlled temperature is continuously circulated at a high velocity about the material being treated. The hangers travel down a chain conveyor as indicated in Figure 2 through the length of oven 48 and the hangers are finally manually unloaded adjacent to sprocket 49 after leaving oven 48. A new load of material to be treated is then placed on the hangers and they are hung on conveyor 50 which circles around pot 16 and delivers the hangers to the sprocket 51 where they are engaged by fork 8 of boom 9 and placed in the pot. From this point the cycle of operation proceeds continuously substantially as described.

Figure 5:
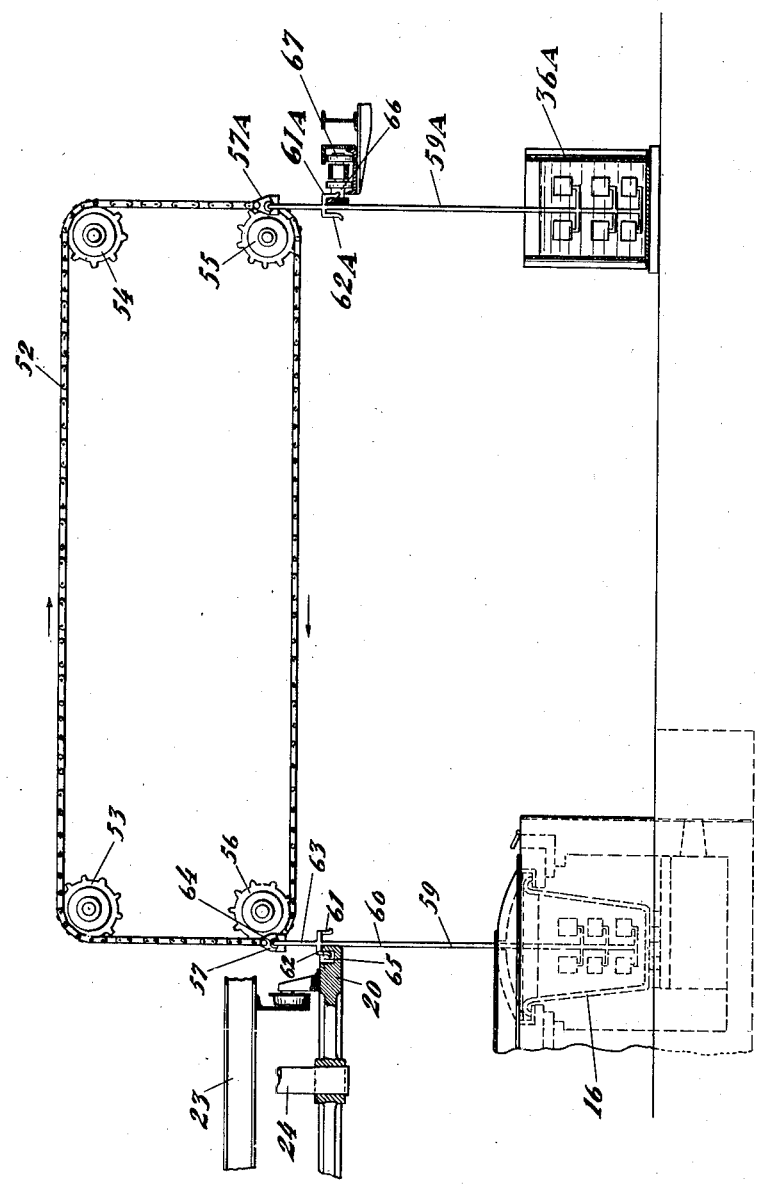
Figure 5 shows a modification of the portion of my equipment including a mechanical device for transfering the material being treated from one step of the process to another.

In Figure 5 the mechanical transfer device shown consists of a continuous endless chain 52 passing over a series of four sprockets respectively 53, 54, 55 and 56. One of these sprockets as for example 55 may be the driver and the other sprockets are idlers to control the direction and movement of chain 52. Chain 52 carries one or more saddles 57 and 57a which may be spaced as desired. The direction of the chain is as indicated by the arrows adjacent thereto. The hanger 59 in this case is provided with a shank 60 carrying two forks 61 and 62 and an extension 63 having at its upper end a pin 64 bent to engage with saddle 57. Shaft 24 carrying ring 20 as illustrated in Figure 1 contains a curve or pocket 65 arranged to engage with fork 62 of hanger 59. When transfer saddle 57 carried by chain 52 comes in contact with pin 64 of extension 63, the saddle 57 engages with pin 64 lifting fork 62 out of notch 65 thereby freeing hanger 59 from the rotating conveyor above the cyanide pot. The chain then carries the saddle 57 first upward and then horizontally upwards to sprockets 54 and 55. From sprockets 54 the chain travels downward so that the saddle now indicated by 57a deposits the hanger here indicated as 59a into tank 36a. In traveling downward from sprocket 54 to sprocket 55 thereby lowering saddle 57a in a vertical direction, fork 61a of hanger 59a is engaged with socket 66 of conveyor 67 which serves the same purposes as conveyor chain 44, with the associated equipment as shown in Figure 1 and subsequently. It will be apparent that chain 52 may be driven at very high speeds whereas the rotation of frame or ring 20 and the associated mechanism must travel at relatively low speeds in order to provide sufficient time in pot 16 without having an excessive length of pot. By using the expedients shown therefor, it is possible to quickly transfer the hanger 59 and the material which it is carrying from the heating bath 16 into the quench bath 36a. In commercial practice it has been found highly essential to make such a transfer very rapidly, as otherwise the materials being quenched would lose a considerable temperature by gradual cooling in the air and the desired results cannot be obtained.

I have found that when large amounts of cold material are introduced more or less continuously into a pot containing a fused bath at one point and withdrawn more or less continuously from another point, there is a tendency for the fused bath to lose sufficient heat at the point at which the load is introduced so that un-uniform results are obtained and at times there is a tendency for the fused bath to solidify. In small hand operated pots containing fused salts of the type which have hitherto been used, this difficulty is hardly noticeable, but when continuous production is required some provision for overcoming this trouble is rather necessary.

In order to reduce the amount of heat abstracted from the fused bath at the point of entry of the material being treated, I have provided means for preheating the incoming work using the outgoing products of combustion from the flames which have supplied a portion of their heat to the pot.

This arrangement is quite advantageous for several reasons. It is obviously quite economical as the products of combustion which give up a considerable portion of their heat to the incoming work would otherwise represent a total loss. In addition the heat demand on the pot serves to control the amount of fuel burned beneath the pot and therefore the volume and temperature of the products of combustion. It will be apparent therefore that by using the products of combustion from the pot to preheat the work, the amount of thermal energy available for preheating will be approximately proportioned to the work entering the pot. This automatic proportioning is of obvious advantage in regulating the temperature of the incoming work which might otherwise become excessive. For example steel parts if heated much over 900° F. in the open air are very likely to become oxidized to an appreciable degree. It is even better to limit the maximum temperature to close to 800° F. Even a slight oxidation or scaling effects the surface finish or polish and may in some cases involve considerable additional labor for refinishing. It will be apparent, therefore, that it is desirable to preheat the incoming work as far as possible with the products of combustion, but not beyond a temperature at which oxidation takes place. On the other hand, once the work is immersed in the fused bath, oxidation is practically eliminated since the bath prevents the oxygen in the air from coming in contact with the steel. It is therefore practical to heat polished steel parts in a proper fused bath to any temperature which is ordinarily required for heat treating. Obviously, the temperature selected will depend on the composition, grade and nature of the steel as well as the condition which it is desired to obtain, as a result of the heat treatment. For most purposes, 1600° F. represents a maximum temperature although to obtain certain results with special steels, it is sometimes necessary to reach 1800 or 1900° F.

In transferring the heated material from the fused bath to the quench tank, a thin layer of fused salt adheres to the surface giving reasonable protection from oxidation.

It will be apparent, therefore, that the cycle of operation which I have described, makes it possible to continuously, economically and accurately subject steel or other desired materials to a predetermined heat cycle without appreciable oxidation.

Referring to the drawings, 80 indicates an extended duct connecting to combustion chamber 33 and space 81 around pot 16. Flue 82 (Figure 1) is typical of a series of flues radiating from pot 16 and terminating in a series of outlets 83 which are located immediately below the travel of the hangers which carry the material being treated. A partition wall 84 serves to direct the products of combustion on the material being heated and confine it within the desired space. Covers 85 are provided to auxiliary outlets 86 connecting to flue 82. By opening or closing covers 85 more or less products of combustion can be directed to outlet 83 in order to obtain the temperature desired.

Since the series of outlets 83 are located at fixed points (see Figure 3) it is preferable to have trolleys 7 which are driven by chain 87 move periodically rather than continuously, as this arrangement will permit the series of hangers to spend a greater proportion of the total traveling time over the series of outlets 83. In order to obtain this result, it is of course advisable to have the spacing of trolleys 7 on chain 87 substantially equal to the spacing between the various outlet ports 83. In order to fully assist in obtaining the desired result, it is obviously necessary to periodically start and stop conveyor chain 87 which may be driven in any convenient manner from motor 26 through variable speed device 27, speed reducer 28 and bevel gear 25. I, therefore, provide timer 88 which operates relay 89 from source of power 90. A hand cut-out switch 91 is provided to start or stop the entire mechanism as desired. Timer 88 can be of any available commercial type and serves at periodic intervals to automatically close the electrical circuit which operates motor 26 through relay 89. If desired I may place some form of standard electric cut-out switch or other simple commercial device in such a position as to stop motor 26 when hanger 2 is properly located over outlet port 83.

I provide a ring-shaped contacting member 69 (see Fig. 1, etc.) arranged to contact with hangers 19 as they revolve about pot 16. Contact ring 69 is connected by means of conductor 70 with a source of current, the other terminal of which is connected by means of conductor 71 to electrode 72 which projects into pot 16. If desired the pot itself may be made one of the terminals, although in many cases this procedure is objectionable because of the corrosion of the pot which is likely to follow in case it is made one of the terminals of the electric circuit.

With this arrangement I am enabled to pass a current between electrode 72 and the materials being treated in pot 16.

One of the objects of my invention is to obtain a special chemically treated surface on the steel or other material used. One specially desirable form of surface is that which results from the combination of nitrogen with certain metals present in the steel.

The process which is known today as "nitriding" produces a somewhat similar coating by immersing the article to be treated in an atmosphere of ammonia. The present procedure is slow, costly and somewhat difficult.

Many hours are required to obtain the desired surface treatment, owing to the relatively slow reaction between the ammonia and the steel being treated. Further the amount of ammonia present per cubic foot of gas or per square foot of steel surface is relatively very small with present processes. The present method of nitriding also requires careful exclusion of air which involves a rather elaborate arrangement of seals, doors, covers, etc.

I have found that it is possible to obtain equal or superior results by submitting the article to be treated to the action of a fused bath, containing nitrogen compounds, preferably with carbon or hydrogen as distinguished from oxygen containing compounds such as nitrates. A mixture of fused cyanides and cyanamides is quite effective for this purpose. The addition of caustic soda to a mixture of the above materials also appears to improve the results. In carrying out this portion of my process I pass a current through the fused bath, making the steel to be treated one terminal as outlined above. The current appears to decompose the fused bath liberating cyanagen and nitrogen in a particularly active state. The active nitrogen appears to combine with the steel much more readily than when ammonia is decomposed under present process, thereby materially shortening the time required to produce a nitride case. Somewhat more effective results appear to be obtained when the temperature is held fairly low and in general I have noted that the higher the temperature the greater the tendency for the carbons to combine with the steel.

It is of course well known that certain types of steel are particularly suited to the present form of nitriding. I have found that in general the same types of steel which are of advantage at present may be used with my process. In general, it may be stated that these steels represent alloys containing certain other metals which have a marked tendency to combine with nitrogen. Some of these metals are aluminium, manganese, chromium, sodium, calcium, etc. Contrary to present practice, I have noted that various alkali metals and alkaline earth metals are quite helpful in assisting the reaction between the active nitrogen and the steel. I also find that the addition of cyanamide is a marked advantage in carrying out this reaction.

It should be understood that I do not wish to limit my invention to any particular fused bath as a great many nitrogen containing salts may be used with good results.

It will be obvious that many changes may be made in the actual details of the equipment and process which I have described without departing from the scope of this invention. I have found that the annular shape of pot for containing the fused bath is particularly advantageous for the reasons set forth and also because there is an actual travel of the fused bath within the pot in the direction of movement of the work being treated. This travel of the fused bath obviously serves to bodily carry a portion of the hot bath into what would normally become the cooler portion of the equipment and at the same time this movement tends to carry some of the cooler fused salts into the hotter portion of the bath. In other words, the apparatus I have described serves to mechanically mix the fused bath from various portions of the annular container thereby aiding in holding more uniform temperature conditions and reducing the tendency of the bath to freeze or solidify at certain portions. This arrangement together with the method of preheating which has been described, also serves to materially lengthen the life of the pot which contains the fused bath. In present commercial types of equipment of this class, it is usually found that the pots fail at a certain more or less definite point where an unduly large portion of the thermal work is done. At this point, the pot tends to become over-heated and even a slight excess temperature at any given point has a serious effect in shortening the pot life. By mechanically moving the contents of the fused bath within the pot, I provide means for obtaining greater uniformity of heat distribution not only within the pot but on the pot walls. Also by preheating the work the tendency to produce a cold spot at any given point with a correspondingly greater heat demand is overcome.

It should be understood that I may carry out either the whole process or cycle as here set forth or any portion of it without departing from my invention.

In other words, I may employ the fused bath and related equipment merely as a heating medium without the electrical contacts for forming a nitride coating on the steel. I may use instead of cyanide or other mixtures, fused chlorides, fused nitrates, etc., depending on required temperatures, operating costs and other obvious factors. I may also employ my equipment with or without the quenching and drawing apparatus which is here described.

The exact temperature which gives the most desirable results will of course be controlled by many factors such as the nature of the fused bath, nature of the metal being treated, desired result and other factors. When it is desired to obtain a coating which contains considerable proportions of nitrogen in the steel I prefer to operate at a temperature ordinarily within the ranges of from 700° to 1300° F. Naturally I do not wish to be confined to these particular limits. Somewhat better results in the production of active nitrogen are obtained at the lower temperature range, but the difficulty is frequently encountered when the temperatures are maintained too low so that while active nitrogen is liberated in contact with the metal being treated, it is not absorbed as rapidly as it is produced. Naturally most economical results are obtained when there is an approximate balance between the rate at which active nitrogen is liberated and the rate at which it is absorbed by the metal. In many cases I find a very satisfactory balance obtained at temperatures ranging from 900 to 1000° F. This temperature obviously depends on the composition of the metal being treated, the composition of the bath, the rate of current flow and various other factors all of which may be controlled to produce the desired results. Obviously the greater the rate of current flow the faster will nitrogen be liberated in the vicinity of metal being treated and if the current density is excessive considerable amounts of nitrogen will be wasted. The bath can be replenished from time to time by adding additional quantities of the nitrogen carrier such as calcium cyanamide, various cyanides or in the case of certain baths additional amounts of nitrates or nitrites.

I have found that one mixture which gives quite satisfactory results particularly in forming a nitride coating on steel containing aluminium or manganese, consists of a bath formed from sodium nitrite fused with calcium cyanamide, caustic soda and optionally a proportion of sodium cyanide.

Such a bath apparently under the influence of heat and an electric current exhibits a reaction between the nitrate or nitrite groups and the amino group of the calcium cyanamide setting free active nitrogen.

In the various fused baths which I employ a greater evolution of active nitrogen is ordinarily obtained at the pole toward which the acid radical travels. This is not universally the case, however, as I have encountered a number of contradictory results and have even found that appreciable liberation of active nitrogen and other gases occurs from both poles when an alternating current is employed. In other words, it would appear that in addition to the ordinary electrolytic effect there is an additional effect which may possibly be a thermal one. It is essential that the direction of current flow be such as to avoid excessive corrosion of the material being treated.

It will be apparent that the process here described for producing a hard tough coating on metal surfaces is much more rapid than present commercial methods which consists principally of subjecting the materials to be treated to a gaseous atmosphere containing nitrogen in some form and maintained at a high temperature.

For example I have been able to produce in a relatively few minutes results which require many hours by the present gaseous method. The rate at which I can obtain a nitride coating is apparently limited in the case of my process more by the travel of the nitrogen into the iron, than by the rate of delivery of the nitrogen to the iron or other metals. My process is obviously very economical not only of heat, and time, but also of the materials used and clearly simplifies the apparatus required and the method of handling.

Having now fully described my invention, what I claim as new and wish to secure by Letters Patent in the United States is as follows:

1. The process of treating metal which consists in introducing the metal into a fused bath containing nitrogen compounds and liberating a portion of the nitrogen in said bath in an active form in proximity to said metal being treated, by passing an electric current through said bath and said metal.

2. The process of treating metal which consists in introducing the metal into a fused bath containing nitrogen compounds and electrolytically liberating a portion of the nitrogen in said bath in an active form in proximity to said metal being treated, by passing a direct electric current through said bath and said metal in series.

3. The process of forming a nitrogen containing layer on metal which consists in introducing the metal into a fused bath, containing nitrogen compounds, and liberating by electrical means a portion of the nitrogen in said bath in an active form in proximity to said metal being treated, by passing a current of electricity through said bath and said metal, and causing said liberated nitrogen to combine with said metal.

4. The process of treating metal to form a strong, tough, layer thereon which consists in introducing the metal into a fused bath containing nitrogen compounds, and liberating by electrical means a portion of the nitrogen in said bath in an active form by passing a direct electric current through said fused bath, so as to combine with said metal being treated, and causing said liberated nitrogen to combine with said metal.

5. The process of forming a hard, strong, coating containing nitrogen and carbon on metals which consist in introducing the metal to be coated into a fused bath containing compounds of carbon and nitrogen and passing an electric current through said metal and said bath in series.

6. The process of forming a coating on ferrous metal which consists in introducing the metal into a fused bath containing nitrogen compounds, maintaining said metal in said bath for a controlled time, sufficient to obtain the desired depth of coating, passing an electric current through said metal and said bath thereby electrolytically decomposing said bath and finally quenching said metal.

7. The process of forming a nitrogen containing coating on ferrous metals which consists in introducing said metal into a fused bath containing nitrogen compounds and electrically liberating a portion of the nitrogen in said bath in proximity to said metal being treated, by passing a direct current of electricity through said bath in such a manner as to liberate ammonia from said bath.

WILLIAM A. DARRAH.